Dec. 5, 1967     R. F. FURNESS     3,356,828
ELECTRICALLY HEATED HEAT STORAGE APPARATUS
Filed April 28, 1965
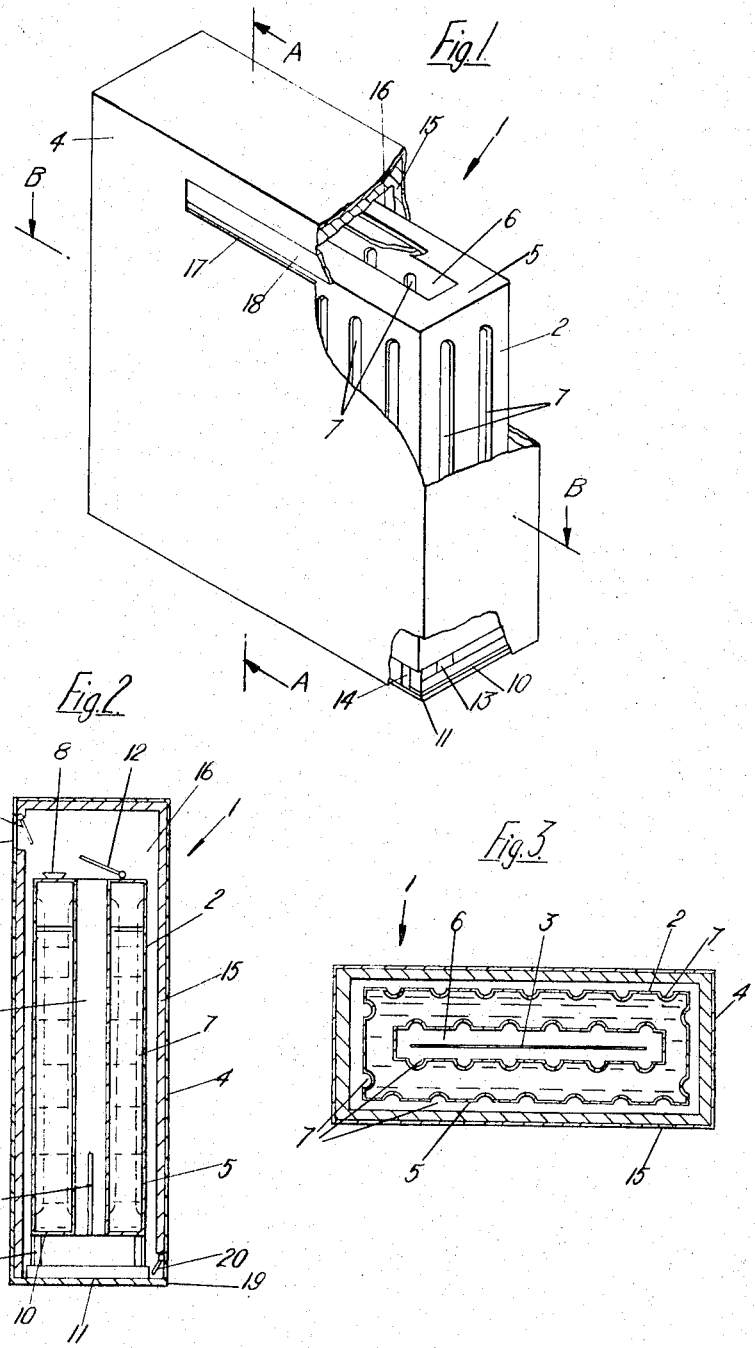

United States Patent Office 3,356,828
Patented Dec. 5, 1967

3,356,828
ELECTRICALLY HEATED HEAT STORAGE
APPARATUS
Raymond Francis Furness, 11 Wellington St.,
Invercargill, Otago, New Zealand
Filed Apr. 28, 1965, Ser. No. 451,475
Claims priority, application New Zealand, Apr. 30, 1964,
138,062
3 Claims. (Cl. 219—365)

This invention relates to heat storage heaters.

Storage heaters have been provided using the specific heat of the heat storage material but these are bulky and generally have limited heat storage capacity within the lower temperature range.

It is an object of the present invention to provide a storage heater using a heat storage material which upon sufficient heating will transform at least in part from the solid phase to the liquid phase so that the latent heat of fusion of the heat storage material is stored for later utilisation.

It is a further object to use a heat storage material in the storage heater selected from a class of microcrystalline petroleum waxes, polyethylene, and synthetic waxes.

It is a further object to use a heat storage material in the storage heater consisting of a mixture of microcrystalline petroleum wax and polyethylene preferably two parts by weight of microcrysalline wax to one part by weight of polyethylene.

One preferred form of the invention will now be described with reference to the accompanying drawings in which;

FIGURE 1 is a pictorial view of the heat storage means according to the present invention with part of the outer casing broken away, FIGURE 2 is a sectional elevation through A—A on FIGURE 1, and FIGURE 3 is a sectional plan through B—B on FIGURE 1.

In the preferred form of the invention the storage heater 1 comprises a heat storage unit 2 adapted in use to be associated with an electric heating element 3 with both the element and heat storage unit being encased in an insulated outside shell 4.

The heat storage unit 2 comprises a liquid-tight container formed as a rectangular receptacle 5 having a rectangular duct 6 centrally positioned therethrough. Vertical corrugations or indentations 7 are provided around the outer surface of the receptacle 5 and also in the duct 6.

In the preferred construction the inner duct corrugations are staggered with respect to the outside corrugations. A gas-tight filler plug 8 is provided to allow access to the interior of the container and through which in use the heat storage unit is filled with a heat storage material.

The heat storage material which upon sufficient heating will transform at least in part from the solid phase to the liquid phase is selected from a class of microcrystalline petroleum waxes, synthetic waxes and polyethylene. Also mixtures of these ingredients may be used.

A suitable synthetic wax is Crystal Wax 220 which consists of a saturated straightened chain of hydrocarbons and almost entirely of N-paraffins, but these are of much longer chain lengths than the N-paraffins found in ordinary paraffin wax.

The type of waxes known as microcrystalline petroleum waxes are also suitable for use as heat storage material and in some ways are preferable to the synthetic waxes above described because of their lower cost. They are available in many grades with various melting points in a range from 71° C. to 94° C. The lower melting point grades are usually the cheapest and for this reason are generally preferable for use in the heat storage unit.

Polyethylene is also suitable as a heat storage material. It is available in many varieties of which the high density polyethylene has the highest latent heat value but the lower density polyethylenes are also useful as heat storage material. It should be noted that where polyethylene is used by itself for heat storage material it is preferable for the receptacle 5 to have a maximum thickness through the heat storage material of approximately two and a half inches, that is from the outer surface to the internal duct 6. This limitation is desirable because of the more viscous nature of the melted polyethylene. The convection currents in molten wax will transfer heat readily, but these do not occur with pure polyethylene.

For this and other reasons it is desirable to utilise a heat storage material comprising a mixture of suitable waxes and polyethylene. A particularly suitable blend is two parts by weight of microcrystalline wax to one part by weight of polyethylene. In order to form this mixture, polyethylene, for example scrap polyethylene is placed in the molten wax which has been heated above the melting point of the polyethylene. The polyethylene is then blended into the wax and the resultant mixture placed in the contained 5.

In some circumstances it is also desirable to incorporate a suitable thermal conductive ingredient in the heat storage material. This thermal conductive ingredient is preferably provided by aluminium powder which has two major effects. First, it increases the thermal conductivity of the heat storage material when in the solid phase and secondly it reduces the effective thermal conductivity of the heat storage material when in the liquid phase. Because of these two effects the aluminium powder greatly helps to reduce the temperature difference between the top and bottom of the heat storage unit 2. Also if it is desired to have a large bulk of heat storage material and a comparatively small heat transfer surface then the aluminium powder will greatly assist in reducing temperature gradients through such a mass. Also in the construction above described if the corrugations 7 were eliminated thus reducing the effective heat transfer surface it would be more desirable to incorporate a quantity of aluminium powder.

Broadly it may be said the use of the aluminium powder assists in overcoming temperature gradients through the mass of heat storage material. With the waxes, the convection currents through the molten wax dispense the powder during the heat-up period and the powder settles during cooling, thus becoming more concentrated at the bottom which of course helps the flow of heat from the element 3 during the first stage of the next heating phase. The proportion of aluminium powder for the best results is between five and eight percent by weight of the heat storage material.

The heat storage unit 2 is supported by suitable legs 9 on channels 10 adapted to be supported on an insulating base 11.

A flap valve 12 is pivotally mounted on the top of the heat storage unit 2 so that in use it may be moved from a position closing the top of the internal duct 6 to a position allowing air to flow through the duct. A control knob is mounted external of the heat storage means to allow the flap 12 to be operated.

The element 3 should preferably be constructed or positioned to provide a heat transfer to the wax or other heat storage material in the order of five watts per square inch of the heat transfer surface and preferably below five watts per square inch to allow a sufficiently lower rate of heat transfer to the heat storage material to prevent a high temperature gradient being established when the material is being heated from ambient temperatures and also when the wax or other material used is nearing the maximum temperature required. In positioning the element relative to the storage material the element should be placed as close to the bottom of the receptacle and in the most remote position from the outside of the radiating or convecting sides of the heat storage unit 2. In this way the release of heat to the outside or sides of the container can be delayed until the last layer of heat insulating wax or other material is melted by the convection currents generated in the molten heat storage material. The convecting and radiating surfaces of the unit 2 thus reach their final temperature towards the end of the charging cycle and rise rapidly as the convection currents through the liquid heat storage material reach the outside of the radiating and convecting surfaces. The preferred position for the element 3 is in the bottom of the central duct 6. The element for example formed as a sinocoidal element is mounted on suitable supports with terminals provided in the ordinary manner for ease of electrical connection.

A thermostat is provided so that the heat storage material cannot be overheated for example a thermostat 13 operating in a fluid expansion or stem-type thermostat may be used to open the contacts in the usual manner. A safety thermal cut-out 14 is also provided which operates if the thermostat should fail.

The outer casing 4 is formed as a metal shell arranged to surround the heat storage unit 2. The metal casing may be of any desired shape provided that an aesthetically pleasing finish is obtained. A jacket of insulating material 15 is supported on the inner surface of the casing 4 to minimise heat loss. The outer casing 4 is arranged so that the space 16 is provided above the unit 2 and a duct 17 with a control flap 18 opens through the outer case 4 into the space 16. A further duct 19 and control flap 20 are positioned in the lower part of the back face of the casing 4 to allow air to enter and pass through the duct 6 prior to delivery out through the duct 17. Each of the flaps 6, 18 and 20 are controlled external of the casing 4 for example by suitable linkages operable by a knob not shown in the accompanying drawings, thus in combination providing controlled heat dissipating means.

The use of the above described invention will be apparent from the foregoing. The storage heater is particularly suitable for connection to an electrical supply source metered at the lower rate for off-peak power supply. With a heater so connected the power is supplied for example for an eight-hour period during the night when the ducts are closed by the flap valves thus ensuring a substantial portion of heat delivered by the element 3 is transferred to the heat storage material.

Where the microcrystalline waxes are used there is an average specific heat of 0.5 and the latent heat of fusion is approximately 55 Kcal. per kilogram. It will be realised the specific heat value for these substances varies with temperature and the above figures represent an approximation taken over the heat range. Also the figure given for the latent heat of fusion may include heat of transition from one crystalline modification to another, but for the present purposes the heat storage effects of the transition and fusion cannot easily be isolated and the overall result is that the fusion of the material requires approximately 55 Kcal. per kilogram.

Where polyethylene is used for the heat storage material the latent heat of fusion of a high density polyethylene is approximately 67 Kcal. per kilogram with an average value of 0.5 for the specific heat. The melting point is about 130° C. The low density polyethylene has a lower latent heat value and a melting point of approximately 115° C. but again with a specific heat of 0.5.

For the mixture of the microcrystalline wax and polyethylene the latent heat of fusion would average something slightly in excess of 55 Kcal. per kilogram with the specific heat again approximately 0.5.

It will thus be seen that a storage means suitable for use in the home may store a considerable amount of heat and heat substantially in excess of that stored by a heater relying on the specific heat only. The maximum temperature to which the heat storage material should be raised is 232° C. and preferably with the materials above described a lower temperature of 177° C. would be used. The thermostat 13 and thermal cut-out 14 ensures that the maximum temperature is not exceeded.

The heat stored in the heat storage material may be utilised by the operator controlling the control flaps or dampers 17, 6 and 20. In this way a draught of air is allowed to pass over the heat storage unit 2 and through the duct 6 to deliver a stream of heated air out through the vent 17. During this cooling the latent heat of fusion will be given up causing the heat storage material once more to solidify. This of course represents a large amount of the heat stored but the temperature will continue to drop until the heat storage material is once more at ambient temperatures or until the element is again connected to a source of electrical energy.

The above preferred form of the invention may be modified in a number of ways.

The receptacle used in the heat storage unit may be varied according to the amount of heat which it is required to store, the rate of output required and the heat storage material used in the container. Fins, corrugations or internal ducts may be incorporated with the receptacle to allow for a greater rate of heat transfer from or to the heat storage material. Also if desired tubes may be incorporated through the container to assist in adjusting the above rate of heat transfer.

It will be apparent that the foregoing construction may be modified in different ways. Thus by using a container much larger than would be used for unit type heaters and with enough material sufficient for the purpose required and by efficiently insulating the container to prevent escape of the heat and then extracting the heat when required by circulating water or by forcing air through cooling tubes or ducts with or without associated cooling fins an efficient extraction of heat and an efficient storage thereof will be obtained. If air is used as the heat transfer medium the air may also flow around the outside of the container, between the container and the heat insulation as well as through the duct or tubes provided. The hot water or hot air may be used for central heating of buildings. Another manner in which the foregoing construction may be modified lies in the construction, which may be used for a simple non-controlled output unit type storage heater. In this type of heater a storage container is provided, as described previously but the outer insulated case is eliminated. Part of the container may be insulated, the amount of heater surface to be insulated depending on the radiation and convection required, the surface finish and the material used to construct the container, and the rate of heat output required. The radiating and convection surface is preferably protected by an open mesh guard or grill to prevent direct contact with the container surface.

What I claim is:

1. A heat storage heater comprising a liquid-tight container; support means supporting said container relative to a supporting surface; a heat storage material contained in said liquid-tight container, said heat storage material consisting of a mixture of microcrystalline petroleum wax, polyethylene and between five and eight percent by weight of an aluminum powder; an electric heating element positioned to transfer heat to said heat storage material, said electric heating element having a capacity sufficient to effect fusion of said material and a heat dissipating means associated with said container to allow for utilization of the heat stored in said heat storage material.

2. A heat storage heater as defined in claim 1 wherein the mixture contains two parts by weight of microcrystalline petroleum wax to one part by weight of polyethylene.

3. A heat storage heater comprising a gas-tight receptacle with a centrally positioned internal duct extending therethrough; supporting legs supporting said receptacle on an insulated base; a heat storage material partially filling said receptacle, said heat storage material consisting of a mixture of two parts by weight of microcrystalline petroleum wax, to one part by weight of polyethylene and between five and eight percent by weight of an aluminum powder; an inert atmosphere of sufficient volume to allow for expansion of said storage material filling the remainder of said receptacle, with said inert atmosphere being at a negative pressure at ambient temperatures; an electric heating element positioned in the lower portion of said internal duct to transfer heat to said heat storage material; said electrical heating element having a capacity sufficient to effect fusion of said material and heat dissipating means associated with said container to allow for utilization of the heat stored in said heat storage material.

References Cited

UNITED STATES PATENTS

| | | | |
|---|---|---|---|
| 1,054,409 | 2/1913 | Harrison et al. | 219—365 |
| 2,000,455 | 5/1935 | Ralston et al. | 219—341 |
| 2,022,812 | 12/1935 | Roe | 219—365 |
| 2,640,478 | 6/1953 | Flournoy | 126—375 |
| 2,702,334 | 2/1955 | Kleist | 219—345 |
| 2,856,506 | 10/1958 | Telkes. | |
| 3,013,104 | 12/1961 | Young | 165—104 X |
| 3,148,676 | 9/1964 | Truog et al. | 126—400 X |

FOREIGN PATENTS

| | | |
|---|---|---|
| 1,300,946 | 7/1962 | France. |

ANTHONY BARTIS, *Primary Examiner.*